(12) United States Patent
Katase

(10) Patent No.: US 7,222,998 B2
(45) Date of Patent: May 29, 2007

(54) DEVICE FOR ILLUMINATING LICENSE PLATE

(75) Inventor: Tomoshi Katase, Shizuoka (JP)

(73) Assignee: Koito Manufacturing Co. Ltd., Tokyo (JP)

( * ) Notice: Subject to any disclaimer, the term of this patent is extended or adjusted under 35 U.S.C. 154(b) by 13 days.

(21) Appl. No.: 11/129,411

(22) Filed: May 16, 2005

(65) Prior Publication Data

US 2005/0286258 A1 Dec. 29, 2005

(30) Foreign Application Priority Data

Jun. 24, 2004 (JP) ............ P.2004-185780

(51) Int. Cl.
*B60Q 1/56* (2006.01)
(52) U.S. Cl. .................................... 362/497
(58) Field of Classification Search ............... 362/497
See application file for complete search history.

(56) References Cited

U.S. PATENT DOCUMENTS

| | | | | |
|---|---|---|---|---|
| 4,868,723 A | * | 9/1989 | Kobayashi | 362/497 |
| 5,067,057 A | * | 11/1991 | Stapel | 362/497 |
| 5,934,798 A | * | 8/1999 | Roller et al. | 362/497 |
| 6,758,587 B2 | * | 7/2004 | Stephens et al. | 362/497 |
| 2005/0286258 A1 | | 12/2005 | Katase | |

FOREIGN PATENT DOCUMENTS

| | | |
|---|---|---|
| DE | 102 11 123 A1 | 10/2003 |
| EP | 1 172 784 A2 | 1/2002 |
| EP | 1 357 332 A2 | 10/2003 |
| GB | 2 322 932 A | 9/1998 |
| JP | 2000-168438 A | 6/2000 |

\* cited by examiner

*Primary Examiner*—Sandra O'Shea
*Assistant Examiner*—James W Cranson, Jr.
(74) *Attorney, Agent, or Firm*—Sughrue Mion, PLLC

(57) ABSTRACT

There is provided an LED as a light source and a reflector for reflecting a light emitted from the LED toward the surface of a license plate LP. The reflector has a first reflector disposed in a region getting out of the optical axis of the LED and a second reflector disposed in a region including the optical axis of the LED, and a light getting out of the optical axis and having a low luminous intensity is reflected by the first reflector to illuminate the vicinal region of the license plate and a light transmitted along the optical axis and having a high luminous intensity is reflected by the second reflector to illuminate a distant region from the license plate. An illuminance in the license plate can be made almost uniform so that the whole surface of the license plate can be illuminated in an equal brightness.

12 Claims, 8 Drawing Sheets

DEVICE FOR ILLUMINATING LICENSE PLATE

The present application claims foreign priority based on Japanese Patent application no. 2004-185780, filed on Jun. 24, 2004, the contents of which is incorporated herein by reference. This foreign priority claim is being made concurrently with the filing of this application.

BACKGROUND OF THE INVENTION

1. Technical Field

The present invention relates to a device for illuminating the license plate (information plate) of a car and more particularly to an illuminating device using an LED (a light emitting diode) for a light source.

2. Background Art

As a device for illuminating a license plate, a related art incandescent bulb has been used for a light source as in JP-A-2000-168438. However, the incandescent bulb has a problem in that its lifetime is short and a great deal of time and labor is required to change the bulb due to a burnout. Furthermore, the amount of consumed power is great, the burden of an on-board battery is heavy, and an installation space is large, and the degree of freedom of the design around the license plate is low. Therefore, use of the LED for the light source has been investigated. Since the LED has a long lifetime, a small size and small power consumption, it is possible to effectively solve the foregoing related art problems of the incandescent bulb.

When the LED is provided on one of the sides of the license plate and a light is irradiated from the LED toward the surface of the license plate to carry out an illumination process, the surface of a close region to the LED can be illuminated to be brighter, and the surface of a region further away from the LED is less illuminated to be darker.

Similarly, a technique using the incandescent bulb in JP-A-2000-168438 has such a problem. For this reason, JP-A-2000-168438 discloses evenly illuminating almost the whole surface of the license plate by providing a diffusion lens step region in a lens to diffuse a light. However, the LED has a high directivity of an emitted light and the surface of a region provided along an optical axis is bright, and the surface of a region away from the optical axis is dark.

Even if the diffusion lens step is simply provided as in JP-A-2000-168438, it is impossible to solve the problem of the nonuniform brightness. Thus, there is a problem in that it is hard to uniformly illuminate the surface of the license plate by the LED.

Moreover, a plurality of LEDs can be provided around the license plate to uniformly illuminate the surface. However, the number of the LEDs is increased so that a cost is increased. Furthermore, it is impossible to avoid the undesired external exposure of the LED provided around the outside of the license plate. As a result, there is another problem in that an outer appearance is deteriorated.

SUMMARY OF THE EMBODIMENTS

It is an object of the invention to provide a device for illuminating a license plate that can uniformly illuminate the surface of a plate via an LED disposed on one of the sides of the license plate. However, this object need not be achieved by the present invention, nor any other object. Alternatively, other objects may also be achieved by the present invention.

The invention provides a device for illuminating a license plate comprising an LED to be a light source and a reflector for reflecting a light emitted from the LED toward a surface of the license plate, wherein the reflector reflects a light along an optical axis of the LED toward a distant region from the license plate and reflects a light getting out of the optical axis of the LED toward a vicinal region of the license plate. More specifically, the reflector comprises a first reflector disposed in a region getting out of the optical axis of the LED and a second reflector disposed in a region including the optical axis of the LED, a light reflected by the first reflector being reflected toward the vicinal region of the license plate and a light reflected by the second reflector being reflected toward the distant region from the license plate.

The invention can also be described as including a device for illuminating a target surface on a vehicle, the device comprising a light emitting diode that emits a light, and a reflector reflecting said emitted light emitted from the light emitting diode toward the target surface. The reflector reflects a first part of the emitted light around an optical axis of the light emitting diode toward a distant region of the target, and a second part of the light substantially away from the optical axis toward a vicinal region of the target surface.

In the invention, the first reflector should reflect a part of a light toward an intermediate region between the vicinal region of the license plate and the distant region therefrom. The first reflector is constituted by a concave rotating plane obtained by rotating, around the optical axis of the LED, a segment on a vertex side of a parabola setting the LED to be a focal point from the optical axis of the LED in the parabola, and the second reflector is constituted by a convex rotating plane obtained by rotating, around the optical axis of the LED, a part of a segment including a region crossing the optical axis of the LED in the parabola.

The invention includes a third plate-shaped reflector for reflecting a light which substantially away from the optical axis of the LED and is not reflected by the first reflector toward a side region of the license plate. Furthermore, a lens is provided having a diffusing step of directly refracting and diffusing a light emitted from the LED toward the vicinal region of the license plate.

The present invention has various advantages. For example, according to the invention, any of lights emitted from the LED having a high directivity which gets out of the optical axis and has a low luminous intensity is reflected by the first reflector to illuminate the vicinal region of the license plate. A light transmitted along the optical axis and having a high luminous intensity is reflected by the second reflector to illuminate the distant region from the license plate. For this reason, an illuminance in the license plate can be made substantially uniform so that the whole surface of the license plate can be illuminated in a substantially equal brightness. In particular, it is possible to enhance the uniformity of the illumination by illuminating an intermediate region with a part of the light reflected by the first reflector. By forming the second reflector as a convex, it is possible to diffuse the light transmitted along the optical axis as compared with when the second reflector is formed like a concave. Thus, it is possible to enhance the utilization efficiency of a light. By supplementally illuminating the license plate with a light reflected by the third reflector, and furthermore, alight transmitted through a lens having the diffusing step, it is possible to further enhance the uniformity of the illuminance of the license plate.

DETAILED DESCRIPTION OF THE EMBODIMENTS

Figure 1:
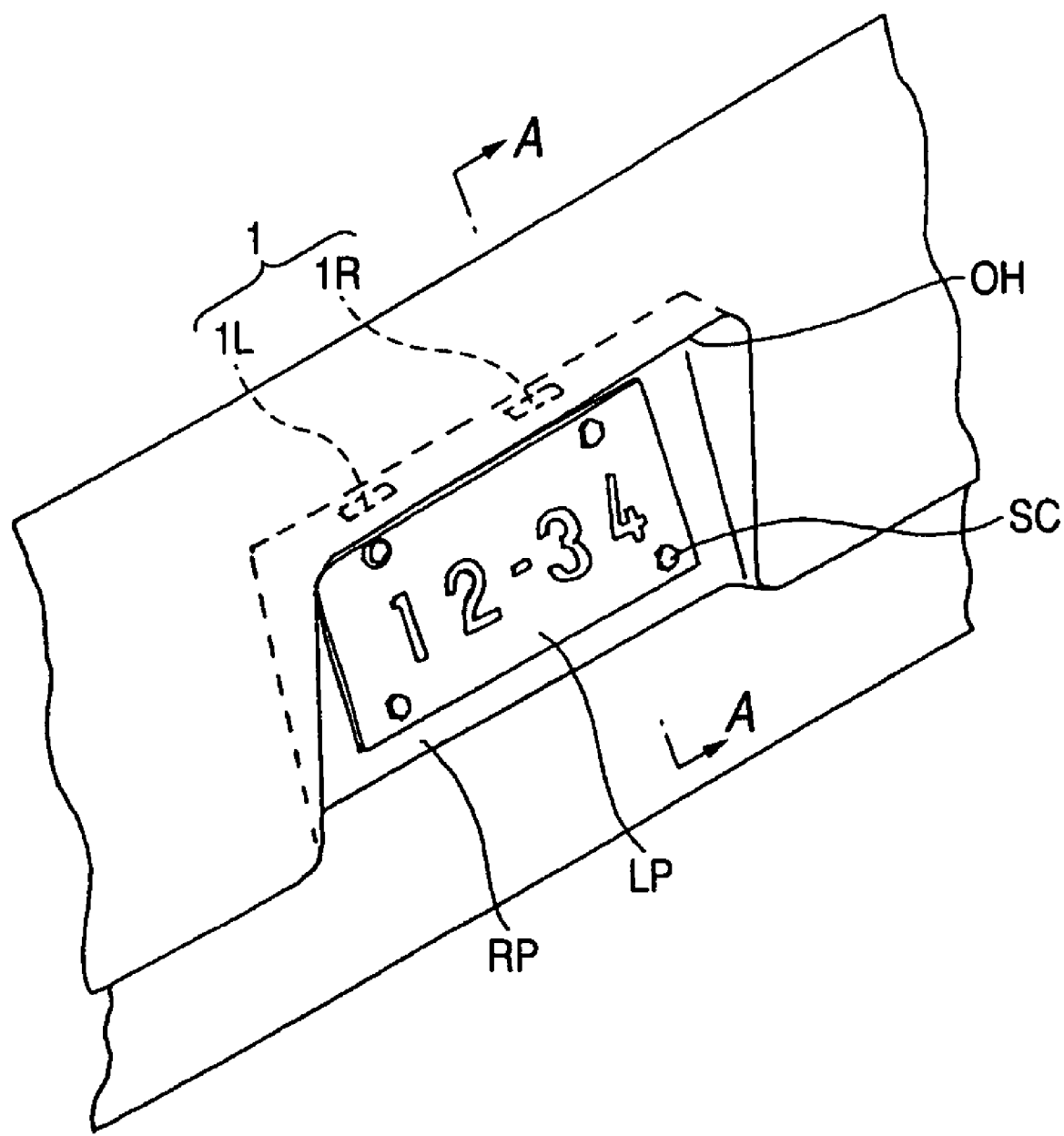
FIG. 1 is a perspective view showing the appearance of an illuminating device.
Figure 2:
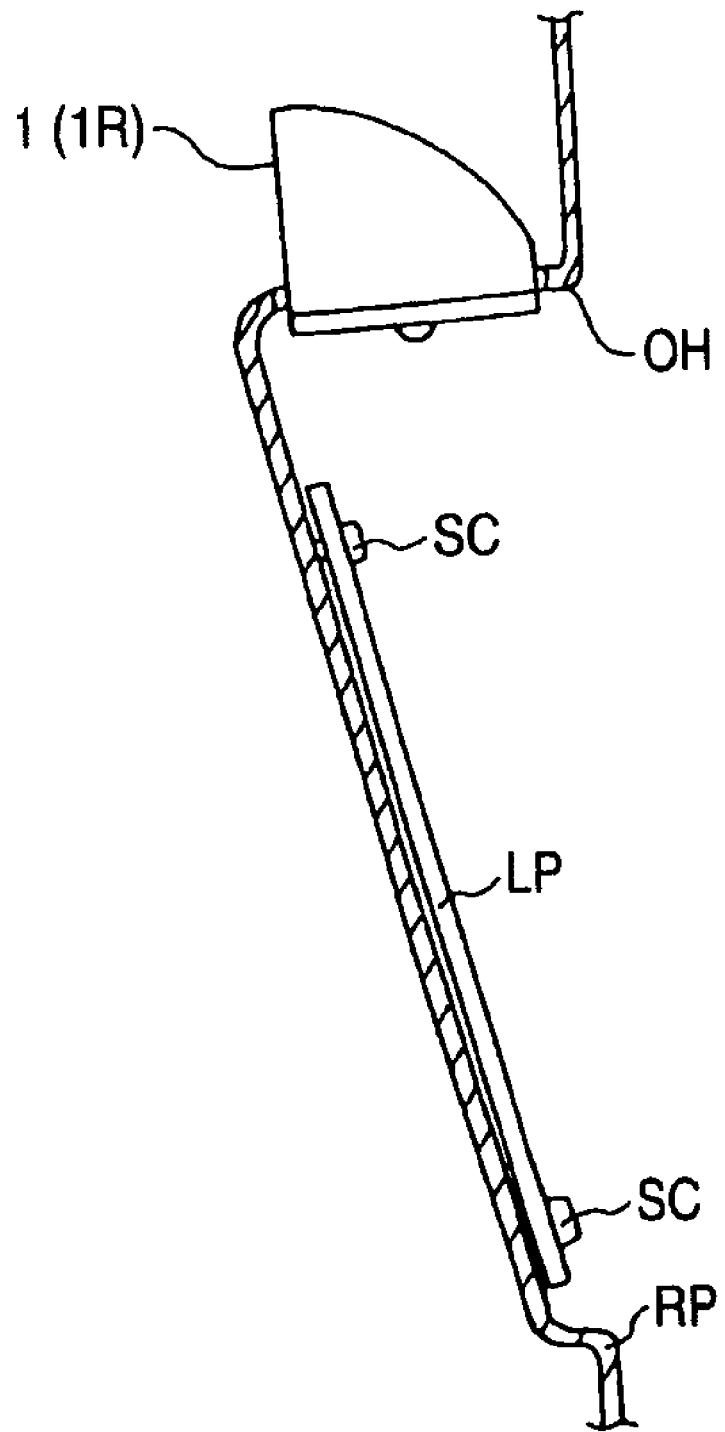
FIG. 2 is a sectional view taken along an A—A line in FIG. 1.

FIG. 1 illustrates the schematic structure of an exemplary, non-limiting embodiment, in which a license plate illuminating device according to the invention is applied to a car. FIG. 2 is a longitudinal sectional view taken along an A—A line in FIG. 1. While the present embodiments specifically disclose a license plate on a vehicle, one skilled in the art would understand that the embodiment is not limited to a license, and can include any target surface, for example but not by limitation, on an exterior surface of a vehicle. Accordingly, the term "target surface" includes, but is not limited to, the below-disclosed license plate and surface thereof.

A part of a rear panel RP in the car is substantially concave, and the surface of the substantially concave portion is inclined slightly upward from a vertical plane. A substantially oblong license plate LP is fixed to the surface of the inclined rear panel in a substantially horizontal direction with a screw SC, or an equivalent fixing device.

A hood portion OH, formed by a protruding part of the rear panel RP as a hood, is provided in the upper region of the license plate LP. An LED structure 1 is provided at a proper interval in two places in the longitudinal direction of the license plate LP on the inside of the hood portion OH, respectively. The LED structure 1 irradiates a light emitted from the LED on the surface of the license plate LP to illuminate the surface of the license plate LP by setting the LED to be a light source as described below. The two LED structures 1 comprise a right LED structure 1R and a left LED structure 1L.

Figure 3:
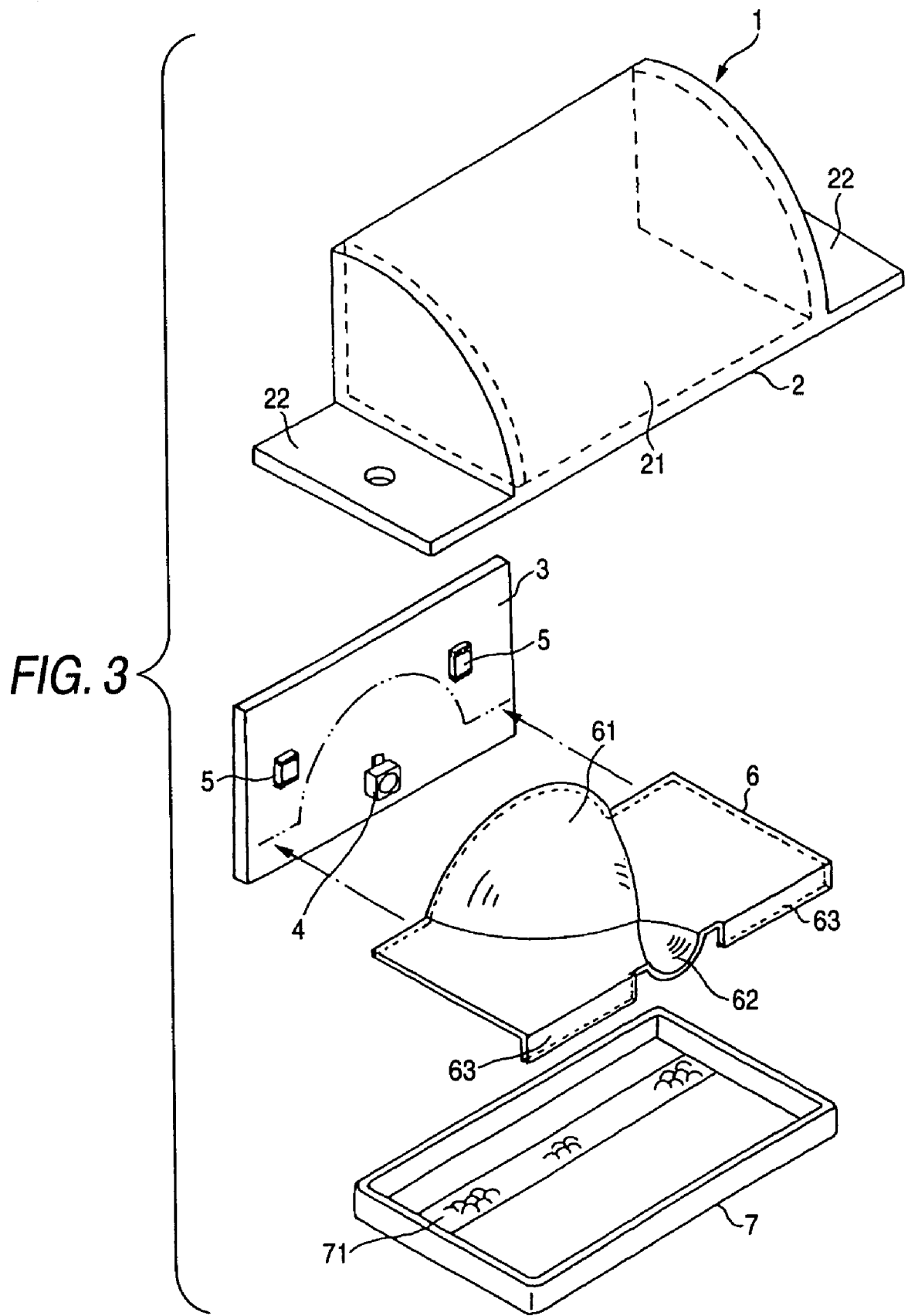
FIG. 3 is a partial exploded perspective view showing an LED structure.
Figure 4:
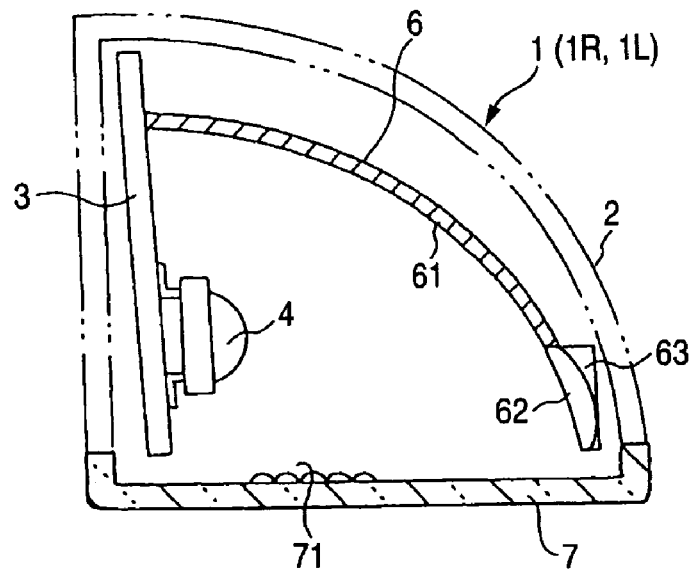
FIG. 4 is a longitudinal sectional view showing the LED structure.

FIG. 3 is a partial exploded perspective view showing the detailed structure of the two left and right LED structures 1 (1R and 1L), and FIG. 4 is a longitudinal sectional view showing the same. In a housing 2, brackets 22 protrude from both sides of a housing portion 21, taking a ¼ cylindrical vessel type and having an erected face and a bottom face which are opened, respectively. The housing 2 is attached to the upper bottom face of the hood portion OH in the rear panel RP of the car at the brackets 22 with a screw (not shown) as shown in FIG. 1.

A board 3 is attached to an open face at an erected face side in the housing portion 21, and an LED 4 is mounted in a close position to a lower side in almost a center in a longitudinal direction on the surface of the board 3. Furthermore, a circuit component 5 for turning on the LED 4 is mounted on another portion. The circuit component is a resistor or any of various well-known diodes, as described below. The LED 4 has an optical axis thereof turned to emit a light in an almost perpendicular direction to the surface of the board 3. Moreover, a reflector 6 that is a reflecting plane obtained by processing a metal plate or forming a resin such as polycarbonate to deposit aluminum on a surface thereof, or to carry out reflection coating, is attached to the surface of the board 3, and a first reflector 61, a second reflector 62 and a third reflector 63 are formed integrally with the reflector 6.

Figure 5:
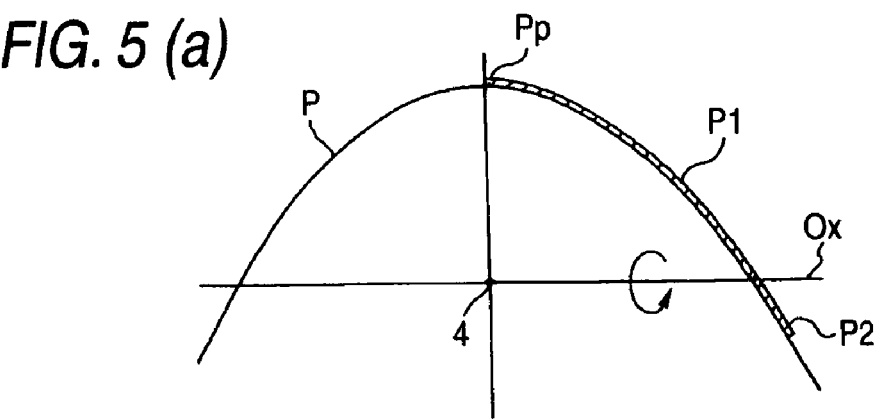
FIGS. 5 A–B are conceptual views for explaining a reflector.
Figure 5:
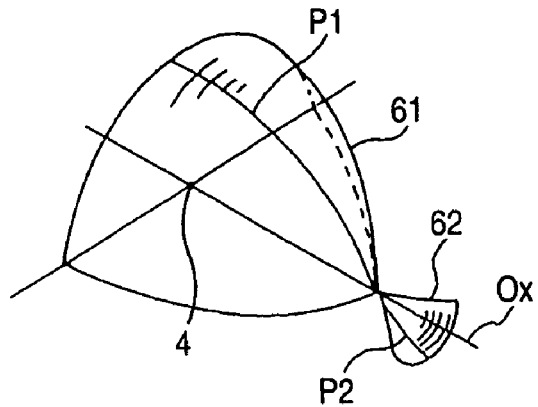

As shown in FIGS. 5(a) and 5(b), the reflector 6 includes, as the first reflector 61, a reflector in which the internal surface of a concave rotating plane is formed by rotating, by half around an optical axis Ox of the LED 4, a segment P1 on a vertex Pp side from the optical axis Ox in a parabola P setting the light emitting point of the LED 4 to be an almost focal point. The foregoing is used as a reflecting plane.

The reflector 6 constitutes, as the second reflector 62, a reflector in which the external surface of a convex rotating plane is formed by rotating a segment P2 having a predetermined length on the opposite side of the vertex by half around the optical axis Ox of the LED 4. The foregoing is used as a reflecting plane in the substantially same manner. As shown in FIG. 3, the reflector 6 constitutes, as the third reflector 63, a plate-shaped portion having a small width turned at a substantially right angle with respect to the optical axis of the LED 4 at both sides of the second reflector 62 in a longitudinal direction (a horizontal direction). The reflector 6 is attached integrally with the surface of the board 3 through a screw or soldering.

As shown in FIG. 3, a substantially rectangular transparent lens 7 formed of a resin is attached to an open surface at the lower side of the housing portion 21. The lens 7 is formed by a white and transparent resin. A part of an internal surface thereof is provided with a diffusing step 71 for refracting and slightly diffusing any of lights emitted from the LED 4, which is directly incident on the lens 7 from the LED 4 toward a substantially central region in the upper part of the license plate LP. A minute concavo-convex portion or crimping is employed for the diffusing step 71. Moreover, the lens 7 is attached to the housing 2 with a screw (not shown).

The LED structure 1 is fixed to the upper bottom face of the hood portion OH by setting the right LED structure 1R and the left LED structure 1L into left and right positions in the upper part of the oblong license plate LP, that is, respective central upper parts in left and right regions obtained by dividing the license plate LP into two parts in a transverse direction. The board 3 in the LED structure 1 is fixed to be turned in a substantially vertical direction to be positioned with the optical axis Ox of the LED 4 and the surface of the lens 7 turned in a substantially horizontal direction and overhung above the surface of the license plate LP.

Figure 6:
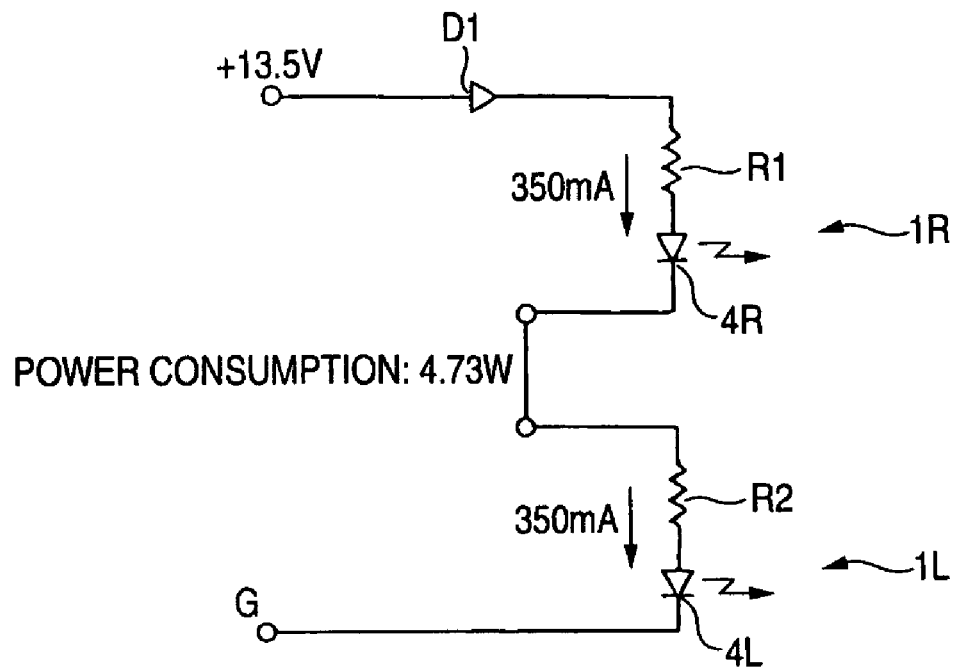
FIGS. 6 A–B are circuit diagrams showing left and right LED structures.
Figure 6:
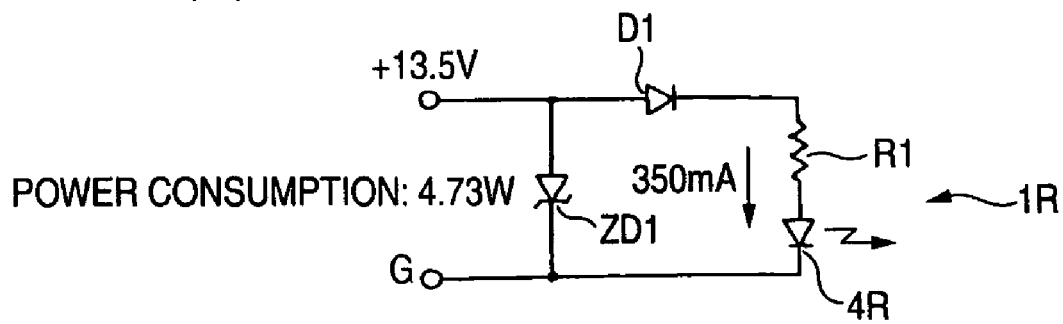
Figure 6:
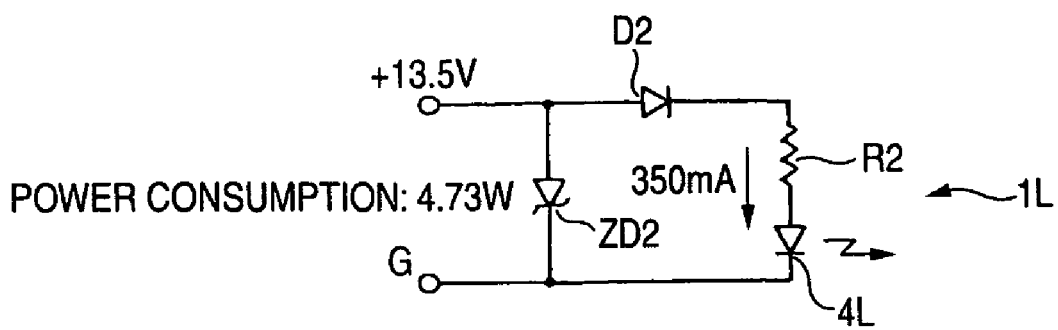

A wiring connection to an on-board power supply is carried out for each of the boards 3 of the LED structures 1R and 1L on the right and left sides. FIG. 6(a) is a wiring circuit diagram, in which the LEDs 4 (4R and 4L) on the right and left sides are coupled to each other in series through resistors R1 and R2 for a voltage drop. Furthermore, a rectifier diode D is coupled in series to an on-board power supply (+13.5V). Thus, the two LEDs 4R and 4L are coupled to each other in series to cause the same current (for example, 350 mA) to flow to each of the LEDs, thereby emitting a light. Consequently, the consumed power is 4.73 W.

On the other hand, in an alternate, exemplary and non-limiting embodiment as shown in FIG. 6(b), the LEDs 4L and 4R are independently provided respectively. In other words, the resistors R1 and R2, rectifier diodes D1 and D2, and Zener diodes ZD1 and ZD2 are coupled to the LEDs 4R and 4L respectively, and are independently coupled to the on-vehicle power supplies respectively to emit a light. The substantially same current (350 mA) is caused to flow to the LEDs 4R and 4L respectively to emit a light.

Consequently, the consumed power in each of the LEDs of FIG. 6(b) is 4.73 W and the total consumed power is a double thereof, that is, 9.46 W. By connecting both of the LED structures 1R and 1L in series as in the exemplary, non-limiting embodiment, accordingly, it is possible to reduce the consumed power by about half. In addition, as is apparent from a comparison between both of the circuit diagrams, the Zener diodes ZD1 and ZD2 are not required, and one of the rectifier diodes can be omitted. Furthermore, the number of components can be decreased.

Figure 7:
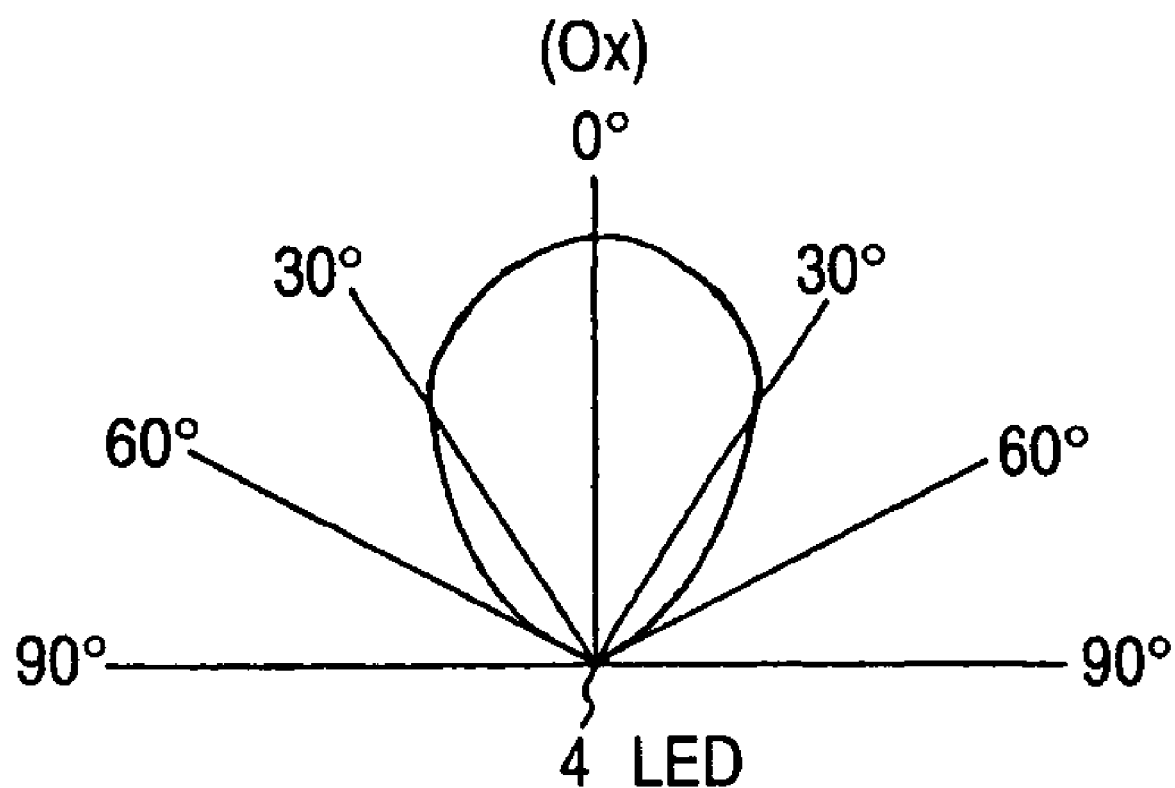
FIG. 7 is a view showing the directivity of an LED.

According to the device for illuminating a license plate having the structure described above, when power is supplied to the LED 4 through the board 3 to cause the LED 4 to emit a light, the light emitted from the LED 4 is reflected by the reflector 6 and is transmitted through the lens 7 or is directly transmitted through the lens 7, thereby illuminating the surface of the license plate LP. The directivity of the LED 4 is shown in FIG. 7 and is reduced to be approximately "½", at an angle of 30 degrees, if the luminous intensity of the optical axis Ox is set to about "1".

Figure 8:
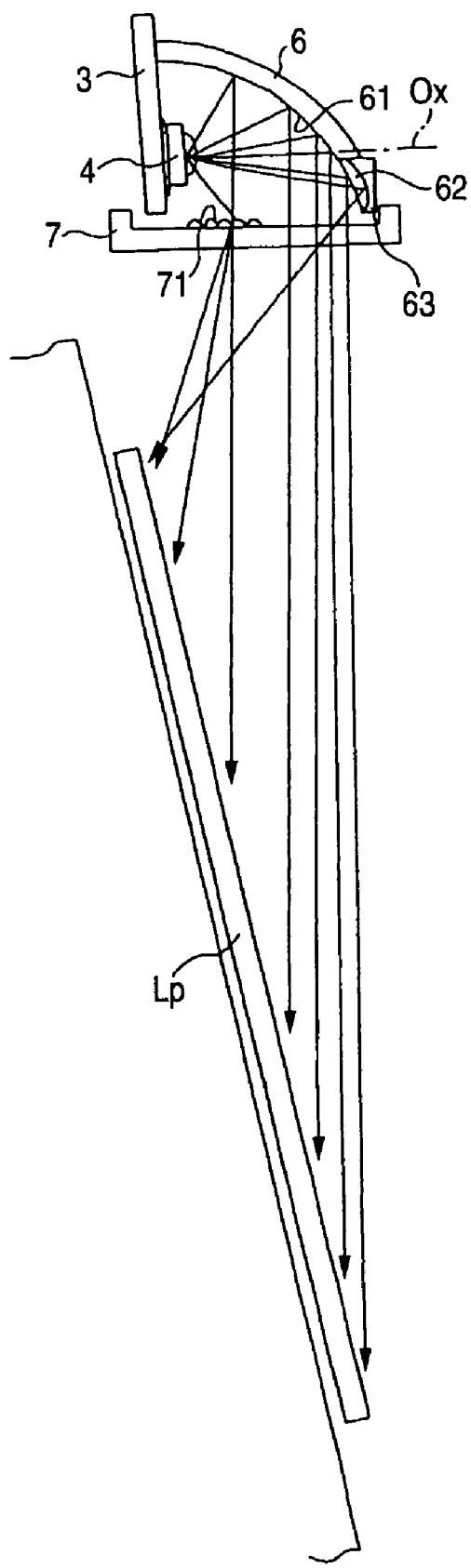
FIG. 8 is a sectional view for explaining an illumination state brought by the LED structure.

As shown in a view illustrating a light track seen from the side of the license plate LP in FIG. 8, a light emitted from the LED 4 in the direction of the optical axis Ox is reflected by the second reflector 62 almost vertically and downward. For at least this reason, the reflected light is reflected toward the lower region of the license plate LP, that is, a distant region seen from the LED 4. At the same time, the same light is reflected to be diffused in a direction around the optical axis, depending on the shape of the rotating plane of the second reflector 62. Consequently, a lower region S2 of the license plate LP is illuminated in FIG. 9 showing a light distributing characteristic seen from the front face of the right half part of the license plate LP in a thick solid line.

Any of light emitted from the LED 4 out of the optical axis Ox is emitted upward from the optical axis Ox and has a relatively low luminous intensity, is reflected vertically and downward by the first reflector 61. As shown in FIG. 8, therefore, the light is reflected toward the upper region of the license plate LP, that is, a vicinal region seen from the LED 4. At the substantially same time, the light is also reflected to be diffused around the optical axis, depending on the shape of the rotating plane of the first reflector 61.

Figure 9:
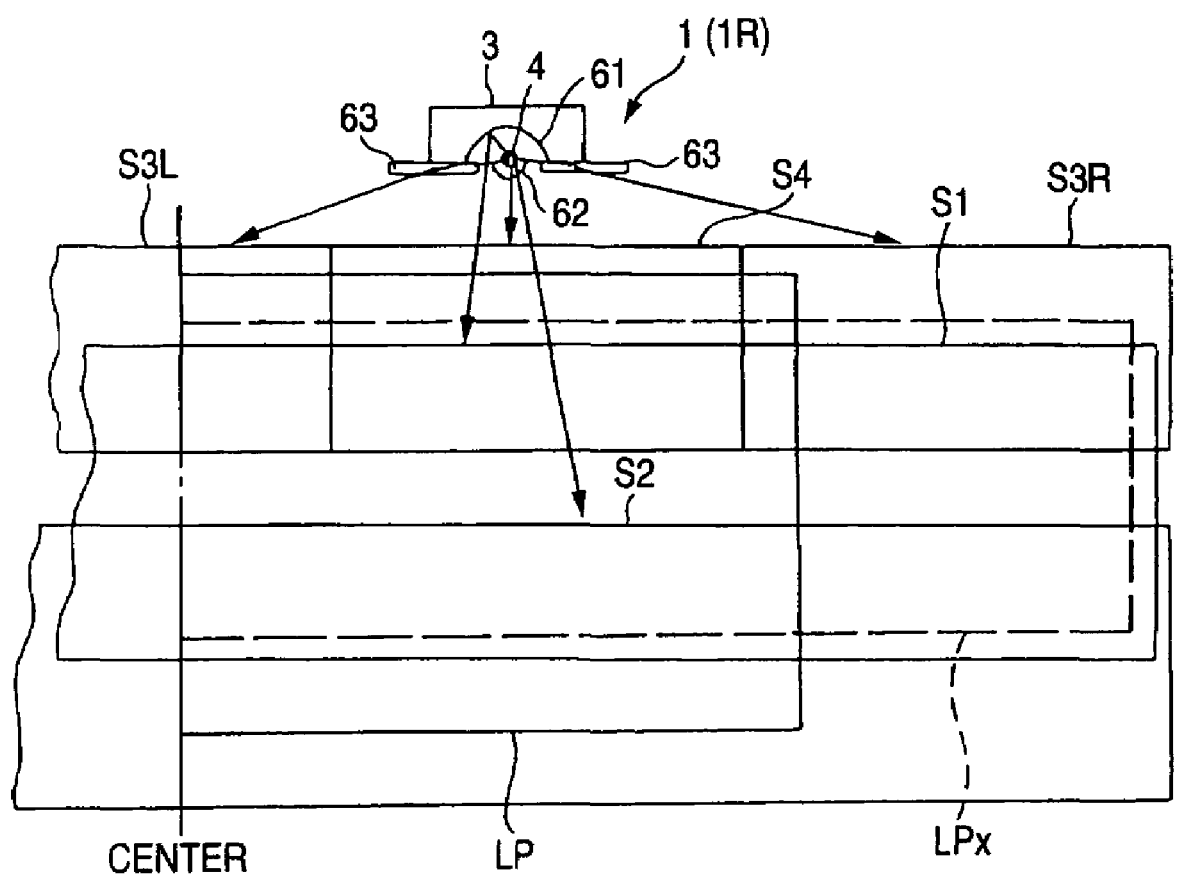
FIG. 9 is a front view for explaining the illumination state brought by the LED structure.

As shown in FIG. 9, the upper region of the license plate LP or an intermediate region S1 is illuminated. A light emitted at a great angle with respect to the optical axis Ox depending on the directivity of the LED 4 shown in FIG. 7 has a low luminous intensity. Therefore, the illuminance of the upper region of the intermediate region S1 in the license plate LP is lower than that of a lower region.

As shown in FIG. 9, a light emitted upward from the optical axis Ox through the LED 4 and toward both outsides of the first reflector 61, and not reflected by the first reflector 61, is reflected substantially vertically and downward by the third reflector 63 toward both sides in the transverse direction of the license plate LP. Consequently, left and right regions S3R and S3L in the upper region, that is, the vicinal region of the license plate LP are illuminated by a light reflected by the third reflector 63 and having a low luminous intensity.

Further, light emitted downward from the optical axis Ox through the LED 4 is refracted and diffused by the diffusing step 71 when it is transmitted through the lens 7, and is refracted and diffused toward almost the central region of the upper region of the license plate LP, as shown in FIG. 8. As shown in FIG. 9, a central region S4 of the upper region of the license plate LP is illuminated by a light transmitted through the lens 7. Accordingly, the upper region of the license plate LP is illuminated in a state in which the light reflected by the first reflector 61, the light reflected by the third reflector 63 and the light transmitted through the lens 7 are superposed.

As described above, referring to FIG. 9, the lower region S2 of the license plate LP is illuminated by a light emitted around the optical axis of the LED 4 and having a high luminous intensity. Even if an optical path length from the LED 4 is great, the illumination can be carried out with an illuminance.

Although the intermediate region S1 in the vertical direction of the license plate LP is illuminated by a light substantially away from the optical axis of the LED 4 and having a low luminous intensity, the optical path length from the LED 4 is substantially small. Consequently, the illumination is carried out in a substantially equal illuminance to the illuminance of the lower region S2. Although the upper region of the license plate LP is illuminated by the light substantially away from the optical axis of the LED 4 and having a low luminous intensity, the illumination is carried out in a superposition with a direct ray transmitted from the LED 4 through the lens 7. Therefore, the illumination is carried out in an illuminance equal to the illuminance of the lower region S2 or the intermediate region S1. Consequently, the illumination can be carried out in an equal illuminance over substantially a whole surface from the upper region to the lower region in the right region of the license plate LP.

The description has been given to the state in which the right half part of the license plate LP is illuminated by means of the right LED structure 1R provided on a right side with respect to the license plate LP with reference to FIG. 9. Further, the left half part of the license plate LP can be illuminated also in the left LED structure 1L. Also in the left LED structure 1L, any of lights emitted from the LED which has a high luminous intensity, includes an optical axis and is transmitted to the vicinity of the optical axis illuminates a distant region from the license plate LP, and a light having a low luminous intensity and getting out of the optical axis illuminates the vicinal region of the license plate LP. Therefore, it is possible to evenly illuminate almost the whole surface of the left region of the license plate LP.

While the description has been given to the example in which the reflector 6 is constituted by the first to third reflectors 61 to 63 in the example 1, it is constituted as an LED structure capable of evenly illuminating almost the whole surface of a license plate LPx which is Europe-compatible and has a horizontal length as shown in a thick broken line of FIG. 9. When the horizontal length is small as in the license plate LP in Japan, which is shown in a thick solid line of FIG. 9, a region to be illuminated by the third reflector 63 is smaller as illustrated in FIG. 9. Therefore, it is possible to form the third reflector 63 to be small-sized. Depending on circumstances, it is also possible to omit the third reflector. Depending on a positional relationship between the LED and the reflector 6, the third reflector may be formed on only one of the sides.

In the foregoing exemplary, non-limiting embodiment, the second reflector 62 is formed as the convex rotary reflecting plane. Therefore, it is possible to reflect a part of the light emitted downward from the optical axis Ox of the LED 4, particularly, a light in the vicinity of the optical axis Ox in a diffusion state by the second reflector 62, thereby illuminating the large region of the license plate LP. Thus, the light emitted from the LED 4 can be used effectively and practically, thereby carrying out the illumination.

When the second reflector has the substantially same concave rotary reflecting plane as the first reflector, the light emitted downward from the optical axis of the LED cannot be reflected in a diffusion state toward the license plate, which is disadvantageous to a diffusion efficiency around the optical axis. Depending on the shape of a parabola constituting the reflector, it is also possible to carry out a design to increase the area of the second reflector and illuminate the intermediate region of the license plate with a part of the light reflected by the second reflector.

While the description has been given to the example in which the two LED structures are provided on left and right with respect to the license plate, it is also possible to employ a structure in which one LED structure is provided in the central position of the license plate when the luminous intensity of the LED is high and the whole surface of the license plate can be illuminated in an illuminance by an LED, and furthermore, when the directivity of the LED is low and the whole surface of the license plate can be evenly illuminated by the reflector and the lens.

Moreover, the diffusing step on the lens may be constituted as a refracting step or a collecting step corresponding to the light reflecting characteristic of a reflector, or these steps may be mixed.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The invention claimed is:

1. A device for illuminating a target surface on a vehicle, comprising:
    a light emitting diode that emits a light; and
    a reflector reflecting said emitted light emitted from the light emitting diode toward the target surface, wherein the reflector reflects a first part of the emitted light around an optical axis of the light emitting diode toward a distant region of the target, and a second part of the light substantially away from the optical axis toward a vicinal region of the target surface;
    wherein the reflector comprises:
    a first reflector which is arranged in a region substantially away from the optical axis; and
    a second reflector in a region including the optical axis, wherein the first part of the emitted light is reflected by the first reflector toward the vicinal region around said optical axis, and the second part of the emitted light is reflected by the second reflector toward the distant region thereof;
    wherein the first reflector is formed in a concave shape, and the second reflector is formed in a convex shape.

2. The device according to claim 1, wherein the first reflector reflects a third part of the light toward an intermediate region between the vicinal region and the distant region.

3. The device according to claim 1, wherein the first reflector comprises a concave rotating plane obtained by rotating, around the optical axis, a first segment on a vertex side of a parabola setting the light emitting diode to be a focal point from the optical axis in the parabola, and the second reflector comprises a convex rotating plane obtained by rotating, around the optical axis, a part of a second segment including a region crossing the optical axis in the parabola.

4. The device according to claim 1, wherein the reflector comprises:
    a third plate-shaped reflector tat reflects a light exiting the optical axis and not reflected by the first reflector, toward a side region of the target surface.

5. The device according to claim 1, further comprising a lens having a diffusing step that refracts and diffuses a direct ray emitted from the light emitting diode toward the vicinal region of the target surface.

6. The device according to claim 4, wherein said third plate reflector has a plate-shaped portion having a small width that turns at a substantially right angle with respect to the optical axis of the light emitting diode at both sides of the second reflector with respect to a longitudinal direction.

7. The device according to claim 1, wherein said device is provided inside of a hood portion, which is formed as a protruding part of a rear panel of the vehicle.

8. The device according to claim 1, wherein said target surface is a license plate of a vehicle.

9. A vehicle license lighting system, comprising:
    a pair of the device according to claim 1,
    wherein said target surface is a license plate, and the pair is provided at two places with respect to the longitudinal direction of the license plate.

10. A device for illuminating a target surface on a vehicle, comprising:
    a light emitting diode that emits a light; and
    a reflector reflecting said emitted light emitted from the light emitting diode toward the target surface, wherein the reflector reflects a first part of the emitted light around an optical axis of the light emitting diode toward a distant region of the target, and a second part of the light substantially away from the optical axis toward a vicinal region of the target surface;
    wherein the reflector comprises:
    a first reflector which is arranged in a region substantially away from the optical axis; and
    a second reflector in a region including the optical axis, wherein the first part of the emitted light is reflected by the first reflector toward the vicinal region around said optical axis, and the second part of the emitted light is reflected by the second reflector toward the distant region thereof;
    wherein the first reflector comprises a concave rotating plane obtained by rotating, around the optical axis, a first segment on a vertex side of a parabola setting the light emitting diode to be a focal point from the optical axis in the parabola, and the second reflector comprises a convex rotating plane obtained by rotating, around the optical axis, a part of a second segment including a region crossing the optical axis in the parabola.

11. A device for illuminating a target surface on a vehicle, comprising:

a light emitting diode that emits a light; and a reflector reflecting said emitted light emitted from the light emitting diode toward the target surface, wherein the reflector reflects a first part of the emitted light around an optical axis of the light emitting diode toward a distant region of the target, and a second part of the light substantially away from the optical axis toward a vicinal region of the target surface;

wherein the reflector comprises a third plate-shaped reflector that reflects a light exiting the optical axis and not reflected by the first reflector, toward a side region of the target surface.

12. The device according to claim 11, wherein said third plate reflector has a plate-shaped portion having a small width that turns at a substantially right angle with respect to the optical axis of the light emitting diode at both sides of the second reflector with respect to a longitudinal direction.

* * * * *